(12) United States Patent
Karaoguz et al.

(10) Patent No.: US 7,650,414 B2
(45) Date of Patent: Jan. 19, 2010

(54) COMMON MEDIA CONSUMPTION ACROSS MULTIPLE MEDIA PROCESSING SYSTEMS VIA SINGLE USER CONTROL

(75) Inventors: Jeyhan Karaoguz, Irvine, CA (US); James D Bennett, Prague (CZ)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/207,440

(22) Filed: Sep. 9, 2008

(65) Prior Publication Data
US 2009/0007206 A1    Jan. 1, 2009

Related U.S. Application Data

(63) Continuation of application No. 10/667,866, filed on Sep. 22, 2003, now Pat. No. 7,424,534.

(60) Provisional application No. 60/448,659, filed on Feb. 18, 2003, provisional application No. 60/432,472, filed on Dec. 11, 2002, provisional application No. 60/443,894, filed on Jan. 30, 2003.

(51) Int. Cl.
*G06F 15/173* (2006.01)

(52) U.S. Cl. ............... 709/226; 709/212; 709/217; 709/219; 709/223; 709/230; 725/85; 725/91; 725/98; 725/100; 725/103; 348/207.1

(58) Field of Classification Search ........... 709/212, 709/217, 219, 223, 226, 230; 725/85, 91, 725/98, 100, 103; 348/207.1
See application file for complete search history.

(56) References Cited

U.S. PATENT DOCUMENTS

| | | | |
|---|---|---|---|
| 5,721,815 A | 2/1998 | Ottesen et al. | |
| 5,721,878 A | 2/1998 | Ottesen et al. | |
| 5,917,997 A | 6/1999 | Bell et al. | |
| 5,930,493 A | 7/1999 | Ottesen et al. | |
| 6,233,428 B1 | 5/2001 | Fryer | |
| 6,349,324 B1 | 2/2002 | Tokoro | |
| 6,480,889 B1 | 11/2002 | Saito et al. | |
| 6,601,087 B1 * | 7/2003 | Zhu et al. | 709/205 |
| 6,631,247 B1 | 10/2003 | Motoyama et al. | |
| 6,643,658 B1 | 11/2003 | Jai et al. | |
| 6,693,896 B1 | 2/2004 | Utsumi et al. | |
| 7,003,795 B2 | 2/2006 | Allen | |
| 7,055,104 B1 * | 5/2006 | Billmaier et al. | 715/765 |
| 7,065,778 B1 * | 6/2006 | Lu | 725/98 |
| 7,075,573 B2 | 7/2006 | Imaeda | |
| 7,080,400 B1 | 7/2006 | Navar | |
| 2002/0016971 A1 | 2/2002 | Berezowski | |
| 2002/0091762 A1 * | 7/2002 | Sohn et al. | 709/203 |
| 2002/0109770 A1 * | 8/2002 | Terada | 348/14.08 |
| 2002/0138842 A1 * | 9/2002 | Chong et al. | 725/87 |

(Continued)

*Primary Examiner*—Liangche A Wang
(74) *Attorney, Agent, or Firm*—McAndrews, Held & Malloy

(57) ABSTRACT

A system and method for the management of common consumption of media in a media exchange network is disclosed. Various embodiments of the present invention provide for control by a first user at a first location in a media exchange network of the simultaneous consumption of media content by other users at other locations in the media exchange network. The media content consumed may comprise audio, still pictures, video, and data. The first user may consume the media content simultaneous with the consumption of the other users, and the media content may be stored at the location of the first user, or at other locations in the media exchange network.

31 Claims, 12 Drawing Sheets

U.S. PATENT DOCUMENTS

| | | |
|---|---|---|
| 2003/0043272 A1 | 3/2003 | Nagao et al. |
| 2003/0115585 A1 | 6/2003 | Barsness |
| 2004/0003040 A1 | 1/2004 | Beavers |
| 2004/0246951 A1 * | 12/2004 | Parker et al. ............... 370/356 |
| 2007/0174886 A1 | 7/2007 | Scheuer et al. |
| 2007/0198738 A1 | 8/2007 | Angiolillo et al. |

* cited by examiner

| CHANNEL LINE UP | <<1PM | 2PM | ... | 6PM | 7PM >> |
|---|---|---|---|---|---|
| | | | HOUR, DAY | | |
| FAMILY VACATIONS | | | | | |
| KID's SPORTS | | | | | |
| | | | | | |
| VACATION in ALASKA VIDEO  802 | Normal estimated Delivery Time: 2 hrs 13 min Cost 59¢ (without Queuing) | | Showing All Day (48 Min), Earliest Order Time: 4:00PM MPEG-2 1.5 Mbps | | |
| VACATION in ALASKA VIDEO  803 | Express estimated Delivery Time: 18 min Cost $1.2 (with Queuing) | | Showing All Day (48 Min), Earliest Order Time: 4:00PM MPEG-2 4 Mbps | | |
| VACATION in ALASKA VIDEO  804 | Overnight Delivery: Avail: Next Morning Cost: 5¢ (Server Stored) | | Showing All Day (48 Min), Earliest Order Time: 4:00PM MPEG-2 19 Mbps | | |

FIG. 8

COMMON MEDIA CONSUMPTION ACROSS MULTIPLE MEDIA PROCESSING SYSTEMS VIA SINGLE USER CONTROL

CROSS-REFERENCE TO RELATED APPLICATIONS/INCORPORATION BY REFERENCE

This application is a continuation of U.S. patent application Ser. No. 10/667,866, entitled "COMMON MEDIA CONSUMPTION ACROSS MULTIPLE MEDIA PROCESSING SYSTEMS VIA SINGLE USER CONTROL", filed Sep. 22, 2003, which issued as U.S. Pat. No. 7,424,534, on Sep. 9, 2008, and which makes reference to, claims priority to, and claims the benefit of U.S. Provisional Patent Application No. 60/448,659, entitled "Common Media Consumption Across Multiple Media Processing Systems Via Single User Control", filed Feb. 18, 2003, U.S. Provisional Application Serial No. 60/432,472, entitled "Personal Inter-Home Media Exchange Network", filed Dec. 11, 2002, and U.S. Provisional Application Serial No. 60/443,894, entitled "Personal Access And Control Of Media Peripherals On A Media Exchange Network", filed Jan. 30, 2003, the complete subject matter of which are hereby incorporated herein by reference, in their entirety. In addition this application makes reference to U.S. Provisional Patent Application Serial No. 60/457,179, entitled "Server Architecture Supporting A Personal Media Exchange Network", filed Mar. 25, 2003, U.S. patent application Serial No. 10/657,390, entitled "Personal Inter-Home Media Exchange Network", filed Sep. 8, 2003, and U.S. patent application Ser. No. 10/660,267, entitled "Personal Access And Control Of Media Peripherals On A Media Exchange Network", filed Sep. 11, 2003, the complete subject matter of which are hereby incorporated herein by reference, in their entirety. With respect to the present application, Applicant hereby rescinds any disclaimer of claim scope made in the parent application or any predecessor or related application. The Examiner is advised that any previous disclaimer of claim scope, if any, and the alleged prior art that it was made to allegedly avoid, may need to be revisited. Nor should a disclaimer of claim scope, if any, in the present application be read back into any predecessor or related application.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Today, a user of a TV (television) set in his home may control the consumption of broadcast media content and media content played by a VCR or DVD player using, for example, a remote control.

Various types of digital media content such as digital images, digital video, and digital audio may be captured using a personal media device such as, for example, a digital camera. A user of a media capture device may capture personal media content and playback at a later time on a TV set in his home. For example, a user of a camcorder may record a personal event, such as a child's sporting event, and playback the recorded event at a later time in his home on his TV set using a VCR. Control of the TV set, VCR, and DVD player is accomplished by the user at his home where the TV set, VCR, and DVD player are located.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for communicating information, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 8 is an exemplary illustration of a TV guide channel user interface showing several options of a pushed media in accordance with an embodiment of the present invention.

DETAILED DESCRIPTION OF THE INVENTION

Certain embodiments of the present invention relate to the control and consumption of media content. In particular, certain embodiments of the present invention relate to providing common media consumption across multiple media processing systems on a media exchange network via single user control.

Figure 1:
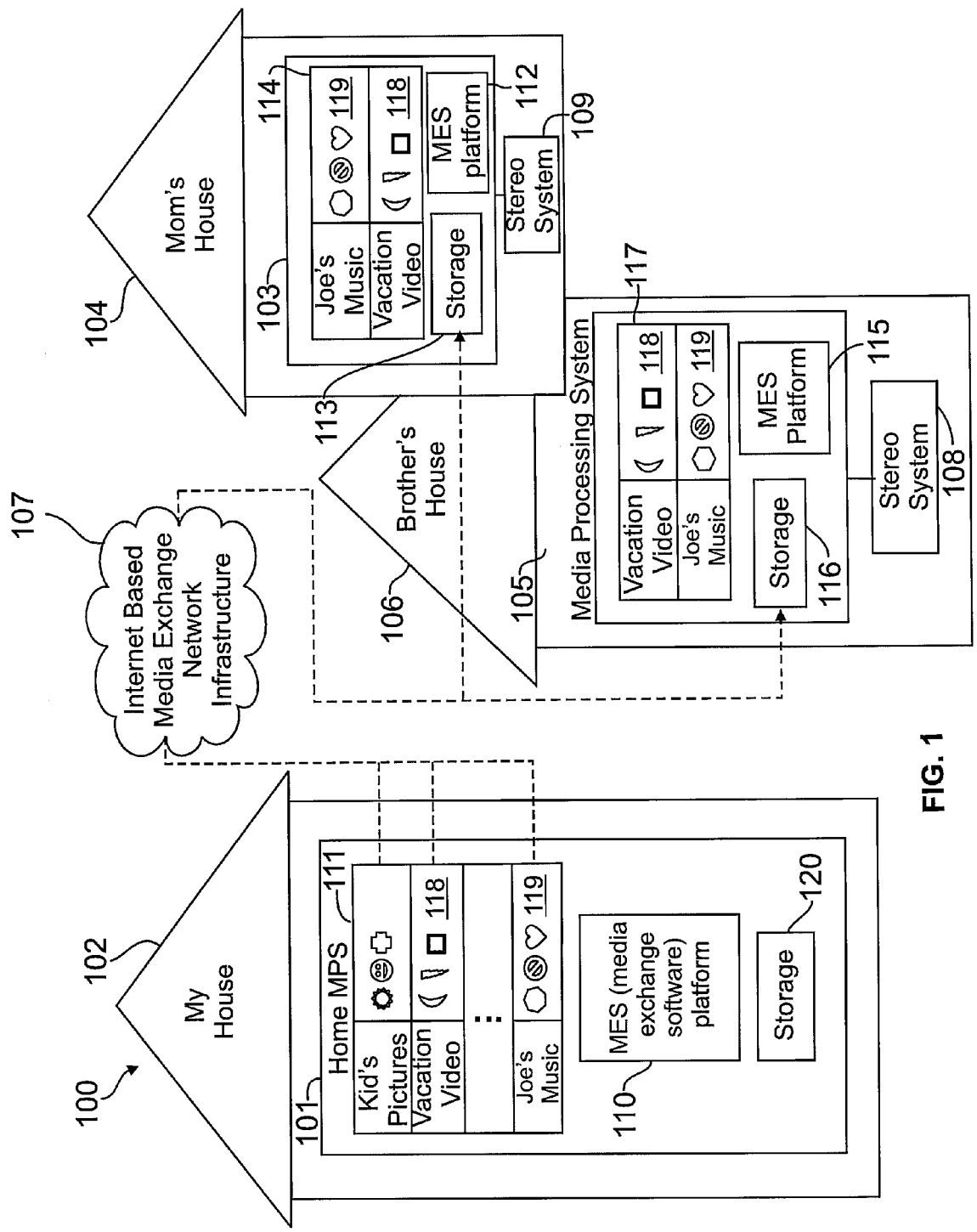
FIG. 1 is a diagram illustrating an exemplary embodiment of a media exchange network supporting common media consumption across multiple media processing systems via single user control, in accordance with various aspects of the present invention.

FIG. 1 is a diagram illustrating an exemplary embodiment of a media exchange network 100 supporting common media consumption across multiple media processing systems via single user control, in accordance with various aspects of the present invention. A media exchange network is a communication network that allows for the exchange of personal media channels between users of the network, in accordance with various embodiments of the present invention.

The media exchange network 100 comprises a home MPS (media processing system) 101 at "my house" 102, a MPS 105 at the first remote location of "brother's house" 106, a MPS 103 at the second remote location of "Mom's house" 104, and an Internet-based media exchange network infrastructure 107 connecting together the home MPS 101, the MPS 105, and the MPS 103.

The home MPS 101 comprises a MES (media exchange software) platform 110 to provide for the exchange of media content with other authorized users of the media exchange network 100 and to provide control and access on the media exchange network 100. The home MPS 101 also comprises a media guide interface 111 for manipulating and consuming media content and a storage area 120 for storing media content.

Similarly, the MPS 105 at "brother's house" 106 comprises a MES platform 115, a media guide interface 117, and a storage area 116. The MPS 103 at "Mom's house" 104 comprises a similar MES platform 112, a media guide interface 114, and a storage area 113. The "brother's house" 106 also comprises a stereo system 108 that is connected to the MPS 105. Similarly, "Mom's house" 104 comprises a stereo system 109 that is connected to the MPS 103. As a result, audio content may be transferred from the MPS's 103 and 105 to their respective stereo systems 109 and 108.

In accordance with various embodiments of the present invention, a MPS may comprise a set-top-box (STB), a PC, or a TV with a media management system (MMS). A MMS is also known herein as a media exchange software (MES) platform.

A MMS comprises a software platform operating on at least one processor to provide certain functionality including user interface functionality, distributed storage functionality, and networking functionality. For example, a MMS may provide control of media peripheral devices, status monitoring of media peripheral devices, and inter-home MPS routing selection, in accordance with an embodiment of the present invention.

The Internet-based media exchange network infrastructure 107 may comprise, for example, cable infrastructure, satellite network infrastructure, DSL infrastructure, Internet infrastructure, intranet infrastructure, a wired infrastructure, and/or a wireless infrastructure providing wide area network (WAN) capability.

Figure 2:
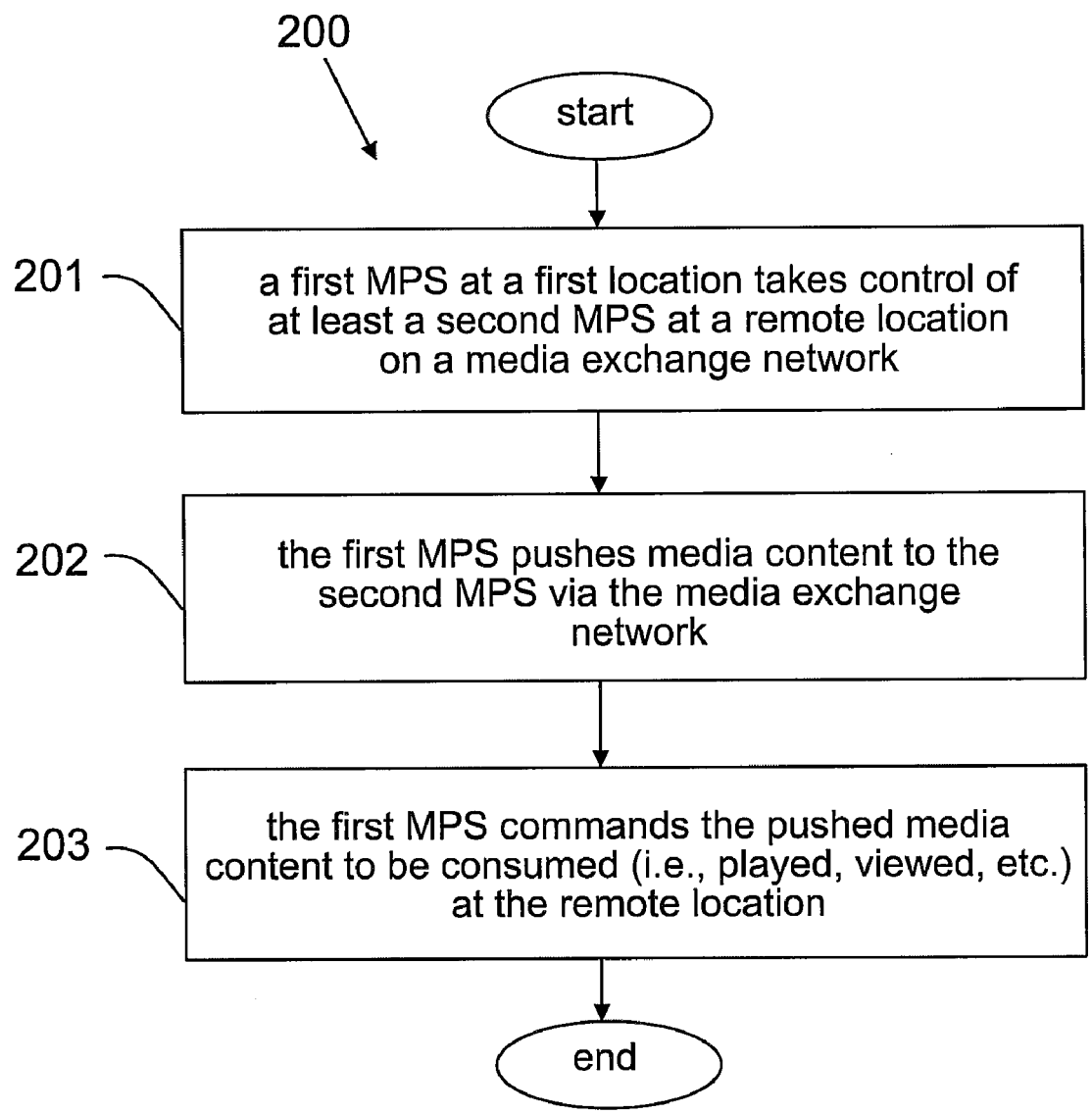
FIG. 2 is a flowchart of an embodiment of a method to achieve common media consumption across multiple media processing systems, on the media exchange network of FIG. 1, via single user control, in accordance with various aspects of the present invention.

FIG. 2 is a flowchart of an embodiment of a method 200 to achieve common media consumption across multiple media processing systems, on the media exchange network 100 of FIG. 1, via single user control, in accordance with various aspects of the present invention. In step 201, a first MPS at a first location takes control of at least a second MPS at a remote location on a media exchange network. In step 202, the first MPS pushes media content to the second MPS via the media exchange network. In step 203, the first MPS commands that the pushed media content be consumed (i.e., played, viewed, etc.) at the remote location.

As an example, referring to FIG. 1, a user of the home MPS 101 at "my house" 102 may take control of the MPS 105 at "brother's house" 106 and the MPS 103 at "Mom's house" 104 using a remote control associated with the MPS 101. In accordance with an embodiment of the present invention, the user of the MPS 101 must have authorization to take control of the MPS 103 and the MPS 105 via the media exchange network 100.

Next, the user of the MPS 101 may command that the media content "Vacation Video" 118 be pushed over the media exchange network 100 to the MPS 103 and the MPS 105. The "Vacation Video" media content 118 may be stored in storage area 116 and storage area 113 after being pushed, or may appear in the media guide interfaces 114 and 117, depending on the exact commands given by the user of the MPS 101.

Finally, the user of the MPS 101 may command that the pushed media content, "Vacation Video" 118, be played on a TV screen of the MPS 103 and a TV screen of the MPS 105 simultaneously. As a result, Mom and brother may view the "Vacation Video" 118 at the same time in the comfort of their respective homes, allowing the user of the MPS 101 to control the consumption.

As another example, referring to FIG. 1, a user of the home MPS 101 at "my house" 102 may take control of the MPS 105 at "brother's house" 106 and the MPS 103 at "Mom's house" 104 using a remote control associated with the MPS 101. In accordance with an embodiment of the present invention, the user of the MPS 101 must have authorization to take control of the MPS 103 and the MPS 105 via the media exchange network 100.

Next, the user of the MPS 101 may command that the media content "Joe's music" 119 be pushed over the media exchange network 100 to the MPS 103 and the MPS 105. The "Joe's music" media content 119 may be stored in storage area 116 and storage area 113 after being pushed, or may appear in the media guide interfaces 114 and 117, depending on the exact commands given by the user of the MPS 101.

Finally, the user of the MPS 101 may command that the pushed media content, "Joe's music" 119, be played on a stereo system 109 interfacing to the MPS 103 and a stereo system 108 interfacing to the MPS 105 simultaneously. As a result, Mom and brother may listen to "Joe's music" 119 at the same time in the comfort of their respective homes, allowing the user of the MPS 101 to control the consumption. As a result, the user of the MPS 101 controls the MPS's and the stereo systems.

In accordance with an embodiment of the present invention, a user at a first location may remotely take control of a MPS and at least one media peripheral (e.g., a stereo system) at a second location. The user may also take control of other MPS's and at least one media peripheral at other remote locations as well, provided the user is authorized to do so.

Although the illustrative examples provided above describe sharing and consumption of audio media content, the present invention is not limited in the forms of media content that may be commonly consumed. Various embodiments of the present invention apply equally to other forms of media content such as, for example, audio, still pictures, video, and data. In addition, the examples above describe support for a media peripheral, in this case, a stereo system. An embodiment of the present invention may also support the use of other media peripherals as sources or playback devices of media content. Examples of such devices include digital still cameras, digital video cameras and camcorders, digital audio recorders, personal computers and PDAs, LCD, plasma, and CRT displays, to name only a few.

While controlling consumption of media content at remote locations, a user at "my home" 102 may consume the same media content, other media content, or no media at "my home" 102, in accordance with various embodiments of the present invention. In addition, the media provided by a media processing system such as, for example MPS 101, 103, 105, may reside on a server within the media exchange network, and may be located separately from the MPS. In various embodiments, a user may use a media guide interface with a TV-guide look and feel to select such media to be delivered and played at other MPS's and/or viewed locally, under their control.

A major challenge is to be able to transfer and share many different types of digital media, data, and services between one device/location and another with ease while being able to index, manage, and store the digital media and data.

For example, it is desirable to be able to distribute and store many types of digital media in a PC and/or television environment in a user-friendly manner without requiring many different types of software applications and/or unique and dedicated interfaces. Any networking issues or other technical issues should be transparent to the users. It is also desirable to take advantage of existing hardware infrastructure, as much as possible, when providing such capability.

In an embodiment of the present invention, a media exchange network is provided that enables many types of digital media, data, and/or services to be stored, indexed, viewed, searched for, pushed from one user to another, and requested by users, using a TV channel guide look-and-feel user interface. The media exchange network also allows a user to construct personal media channels that comprise his personal digital media (e.g., captured digital pictures, digital video, digital audio, etc.), request that third-party media channels be constructed from third-party digital media, and access the media channels pushed to him by other users on the media exchange network.

PC's may be used but are not required to interface to the media exchange network for the purpose of exchanging digital media, data, and services. Instead, set-top-boxes or integrated MPS's (media processing systems) may be used with the media exchange network to perform all of the previously described media exchange functions using a remote control with a television screen.

Current set-top-boxes may be software enhanced to create a MPS that provides full media exchange network interfacing and functionality via a TV screen with a TV guide look-and-feel. PC's may be software enhanced as well and provide the same TV guide look-and-feel. Therefore, the media exchange network supports both PC's and MPS's in a similar manner. Alternatively, a fully integrated MPS may be designed from the ground up, having full MPS capability.

In the case of an MPS configuration, the user takes advantage of his remote control and TV screen to use the media exchange network. In the case of a PC configuration, the user takes advantage of his keyboard and/or mouse to use the media exchange network.

An MPS or enhanced PC is effectively a storage and distribution platform for the exchange of personal and third party digital media, data, and services as well as for bringing the conventional television channels to a user's home. An MPS and/or PC connects to the media exchange network via an existing communication infrastructure which may include cable, DSL, satellite, etc. The connection to the communication infrastructure may be hard-wired or wireless.

The media exchange network allows users to effectively become their own broadcasters from their own homes by creating their own media channels and pushing those media channels to other authorized users on the media exchange network, such as friends and family members.

Figure 3:
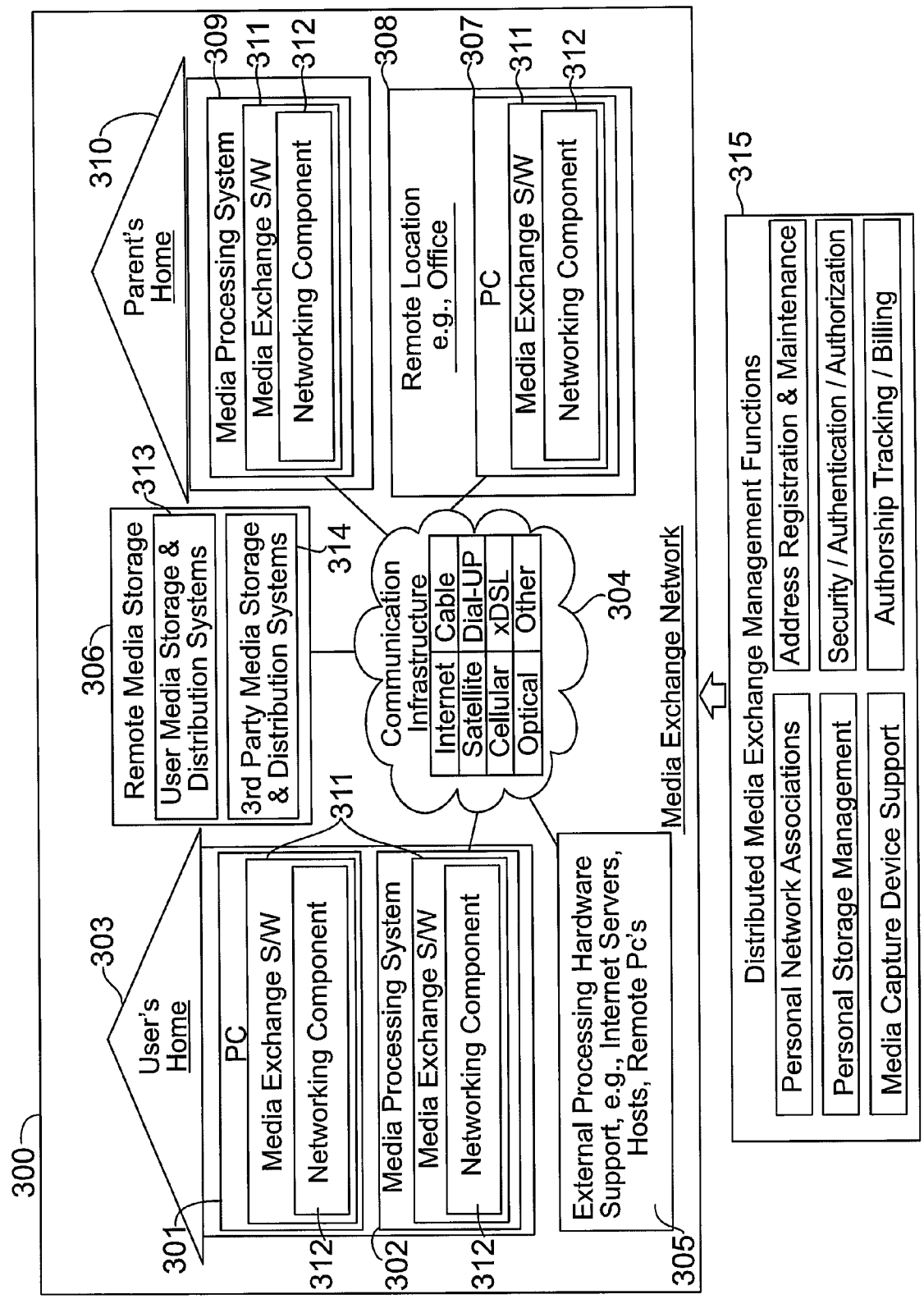
FIG. 3 is a schematic block diagram of a first exemplary media exchange network in accordance with an embodiment of the present invention.

FIG. 3 comprises a media exchange network 300 for exchanging and sharing digital media, data, and services in accordance with an embodiment of the present invention. The media exchange network 300 is a secure, closed network environment that is only accessible to pre-defined users and service providers. The media exchange network of FIG. 3 comprises a first PC 301 and a first media processing system (MPS) 302 at a user's home 303, a communication infrastructure 304, external processing hardware support 305, remote media storage 306, a second PC 307 at a remote location 308 such as an office, and a second MPS 309 at a parent's home 310.

The PC's 301 and 307 and the MPS's 302 and 309 each include a media exchange software (MES) platform 311 and a networking component 312 for connectivity. The MES platform 311 provides multiple capabilities including media "push" capability, media "access" capability, media channel construction/selection, image sequence selection, text and voice overlay, channel and program naming, inter-home routing selection, authorship and media rights management, shared inter-home media experience, billing service, and an integrated TV channel guide look-and-feel.

The external processing hardware support 305 comprises at least one server such as a centralized internet server, a peer-to-peer server, or cable head end. The server may alternatively be distributed over various hosts or remote PC's. The MES platform 311 may also reside on the external processing hardware support server 305. The remote media storage 306 may comprise user media storage and distribution systems 313 and/or third party media storage and distribution systems 314.

The communication infrastructure 304 may comprise at least one of internet infrastructure, satellite infrastructure, cable infrastructure, dial-up infrastructure, cellular infrastructure, xDSL infrastructure, optical infrastructure, or some other infrastructure. The communication infrastructure 304 links the user's home 303, parent's home 310, remote media storage 306, and remote location office 308 to each other (i.e., the communication infrastructure 304 links all users and service providers of the media exchange network 300).

The various functions 315 of the media exchange network 300 comprise generating personal network associations, personal storage management, media capture device support, security/authentication/authorization support, authorship tracking and billing and address registration and maintenance. These media exchange management functions 315 may be distributed over various parts of the media exchange network 300. For example, the personal network associations and personal storage management functions may be integrated in the PC 301 at the user's home 303.

Figure 4:
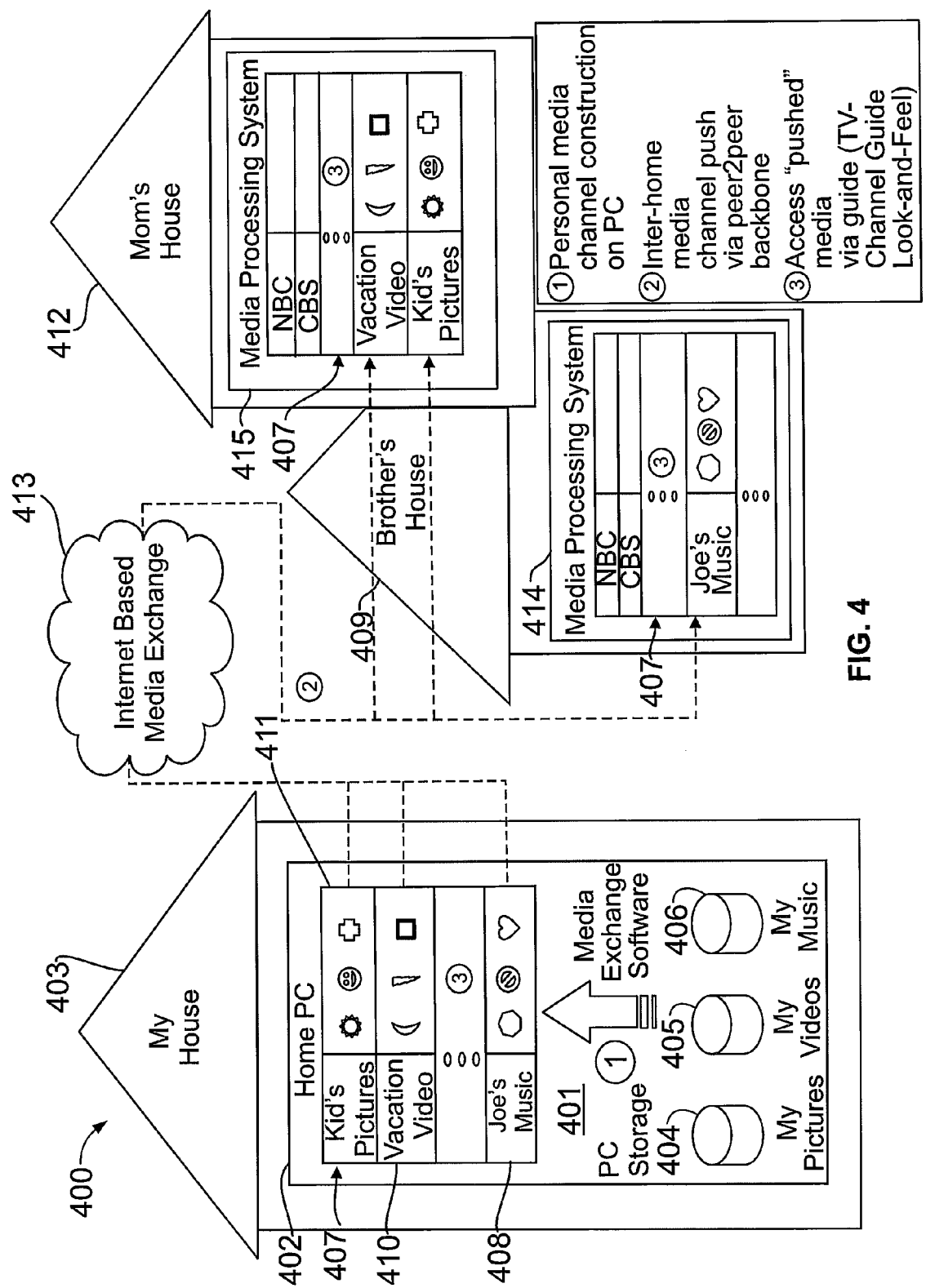
FIG. 4 is a schematic block diagram of performing personal media exchange over a second exemplary media exchange network in accordance with an embodiment of the present invention.

FIG. 4 illustrates an example of personal media exchange over a media exchange network 400 in accordance with an embodiment of the present invention. In step 1, the media exchange software (MES) platform 401 is used to construct personal media channels on a PC 402 by a user at "my house" 403. For example, with various media stored on the PC 402 such as digital pictures 404, videos 405, and music 406, the MES platform 401 allows the digital media to be organized by a user into several channels having a TV channel guide look-and-feel user interface 407 on the PC 402.

In step 2, the user at "my house" 403 pushes a media channel 408 (e.g., "Joe's Music") to "brother's house" 409 and pushes two media channels 410 and 411 (e.g., "Vacation Video" and "Kid's Pictures") to "Mom's house" 412 via a peer-to-peer server 413 over the internet-based media exchange network 400. "Brother's house" 409 includes a first MPS 414 connected to the media exchange network 400. "Mom's house" 412 includes a second MPS 415 connected to the media exchange network 400. The MPS's 414 and 415 also provide a TV channel guide look-and-feel user interface 407.

In step 3, brother and/or Mom access the pushed media channels via their respective media processing systems (MPS's) 414 and 415 using their respective MPS TV screens and remote controls.

Figure 5:
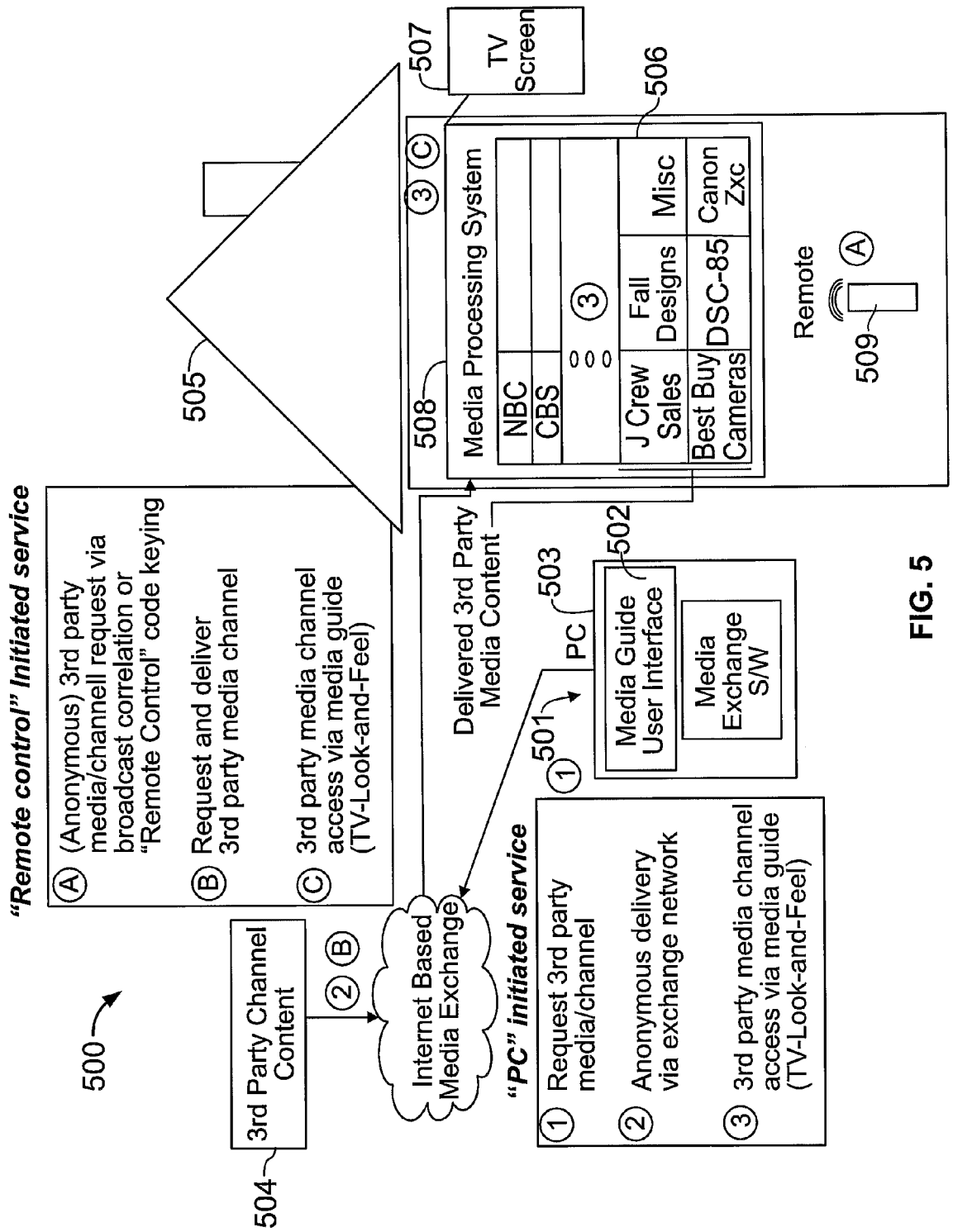
FIG. 5 is a schematic block diagram of performing third-party media exchange over a third exemplary media exchange network in accordance with an embodiment of the present invention.

FIG. 5 illustrates an example of third-party media exchange over a media exchange network 500 in accordance with an embodiment of the present invention. In step 1, a PC-initiated third-party request is made by a first party 501 via an internet-based media exchange network 500 using a TV channel guide look-and-feel user interface 502 on a PC 503. In step 2, an anonymous delivery of the requested third-party channel 504 is made to a second party 505 via the internet-based media exchange network 500. In step 3, the second party 505 accesses the third-party channel 504 using a TV channel guide look-and-feel user interface 506 on a TV screen 507 that is integrated into an MPS 508.

Similarly, in step A, an MPS-initiated third-party request is made by a second party 505 via an internet-based media exchange network 500 using a TV channel guide look-and-feel user interface 506 on a TV screen 507 using a remote control 509. The second party 505 may key in a code, using his remote control 509, that is correlated to a commercial or some other third party broadcast media. In step B, an anonymous delivery of the requested third-party channel 504 is made to a first party 501 via the internet-based media exchange network 500. In step C, the first party 501 accesses the third-party channel 504 using a TV channel guide look-and-feel user interface 502 on a PC 503.

Figure 6:
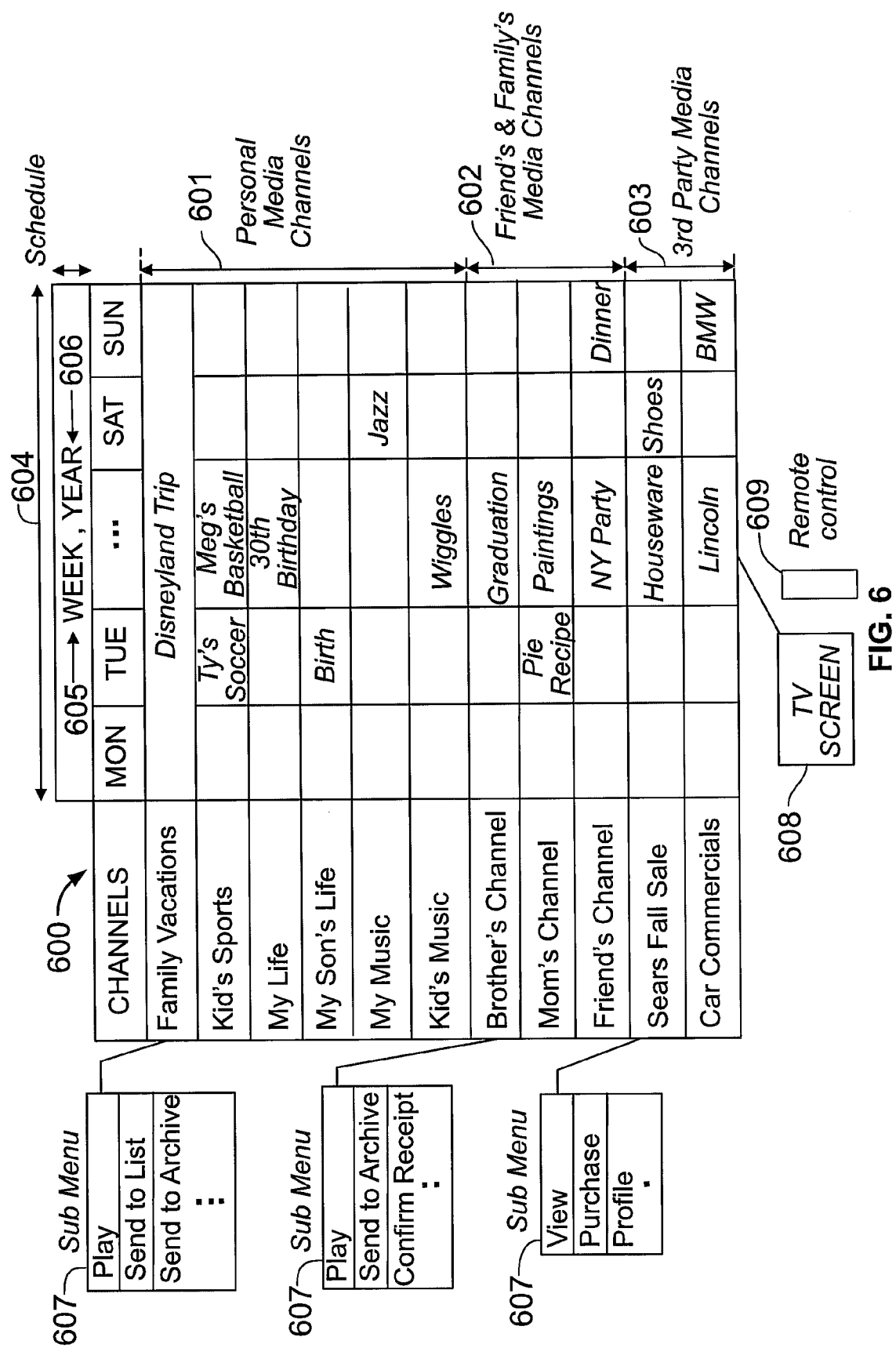
FIG. 6 is an exemplary illustration of a TV guide channel user interface in accordance with an embodiment of the present invention.

FIG. 6 illustrates a TV channel guide user interface 600 in accordance with an embodiment of the present invention. The TV channel guide user interface 600 may be displayed on a TV screen 608 and controlled by a remote control device 609. Also, the TV channel guide user interface 600 may be displayed on a PC monitor and controlled by a keyboard or mouse.

The TV channel guide user interface 600 may be configured not only for conventional TV channels but also for personal media channels 601 that are constructed by a user of a media exchange network, friend's and family's media channels 602 constructed by friends and family, and third party channels 603 that are constructed by third parties either upon request by a user of a media exchange network or based on a profile of a user.

The personal media channels 601 may include, for example, a "family vacations channel", a "kid's sports channel", a "my life channel", a "son's life channel", a "my music channel", and a "kid's music channel". The friends and family media channels 602 may include, for example, a "brother's channel", a "Mom's channel", and a "friend's channel". The third party media channels 603 may include, for example, a "Sears Fall sale channel" and a "car commercials channel".

Each media channel may correspond to a schedule 604 showing, for example, a week 605 and a year 606. For example, under the "kid's sports channel", Ty's soccer game could be scheduled to be viewed on Tuesday of the current week 605 and current year 606. For each media channel, a sub-menu 607 allows for selection of certain control and access functions such as "play", "send to list", "send to archive", "confirm receipt", "view", "purchase", and "profile".

Figure 7:
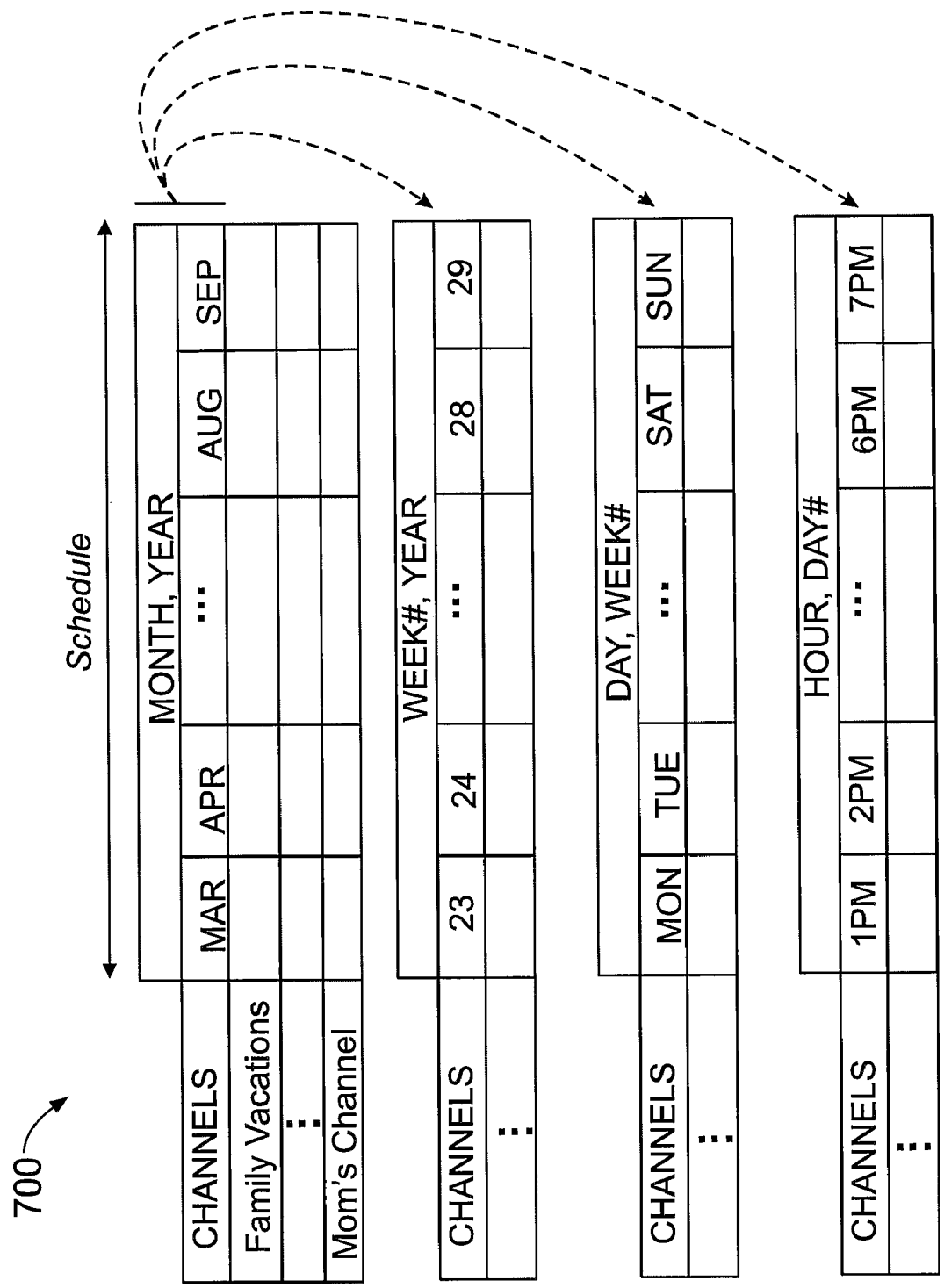
FIG. 7 is an exemplary illustration of several instantiations of a TV guide channel user interface of FIG. 4 in accordance with an embodiment of the present invention.

FIG. 7 illustrates possible multiple instantiations of a TV channel guide user interface 700 in accordance with an embodiment of the present invention. The TV channel guide user interface 700 may be viewed with a schedule having formats of, for example, "month, year", "week#, year", "day, week#", or "hour, day".

Referring to FIG. 8, a user of a media exchange network may push a media channel (e.g., "Vacation in Alaska Video") to a friend who is on the same media exchange network. The TV channel guide user interface 800 may give the friend several options 801 for how to accept and download the pushed media in accordance with an embodiment of the present invention.

For example, a first, most expensive option 803 may be "Express Delivery" which would deliver the pushed media to the friend in 18 minutes using queuing and cost $1.20, for example. The pushed media may be stored in a file in an MPEG 2 format that was recorded at a rate of 4 Mbps, for example. Queuing comprises buffering and delivering a previous part of the media and then buffering and delivering a next part of the media. For example, a first six minutes of the "Vacation in Alaska Video" may be buffered and delivered first, then a second six minutes may be buffered and delivered next, and so on until the entire media is delivered.

A second, less expensive option 802 may be "Normal Delivery" which would deliver the pushed media in 2 hours and 13 minutes without queuing and cost $0.59, for example. The pushed media may be stored in a file in an MPEG 2 format that was recorded at a rate of 1.5 Mbps, for example.

A third, least expensive option 804 may be "Overnight Delivery" which would deliver the pushed media by the next morning and cost only $0.05, for example. The pushed media may be stored in a file in an MPEG 2 format that was recorded at a rate of 19 Mbps and stored on a server, for example.

Figure 9A:
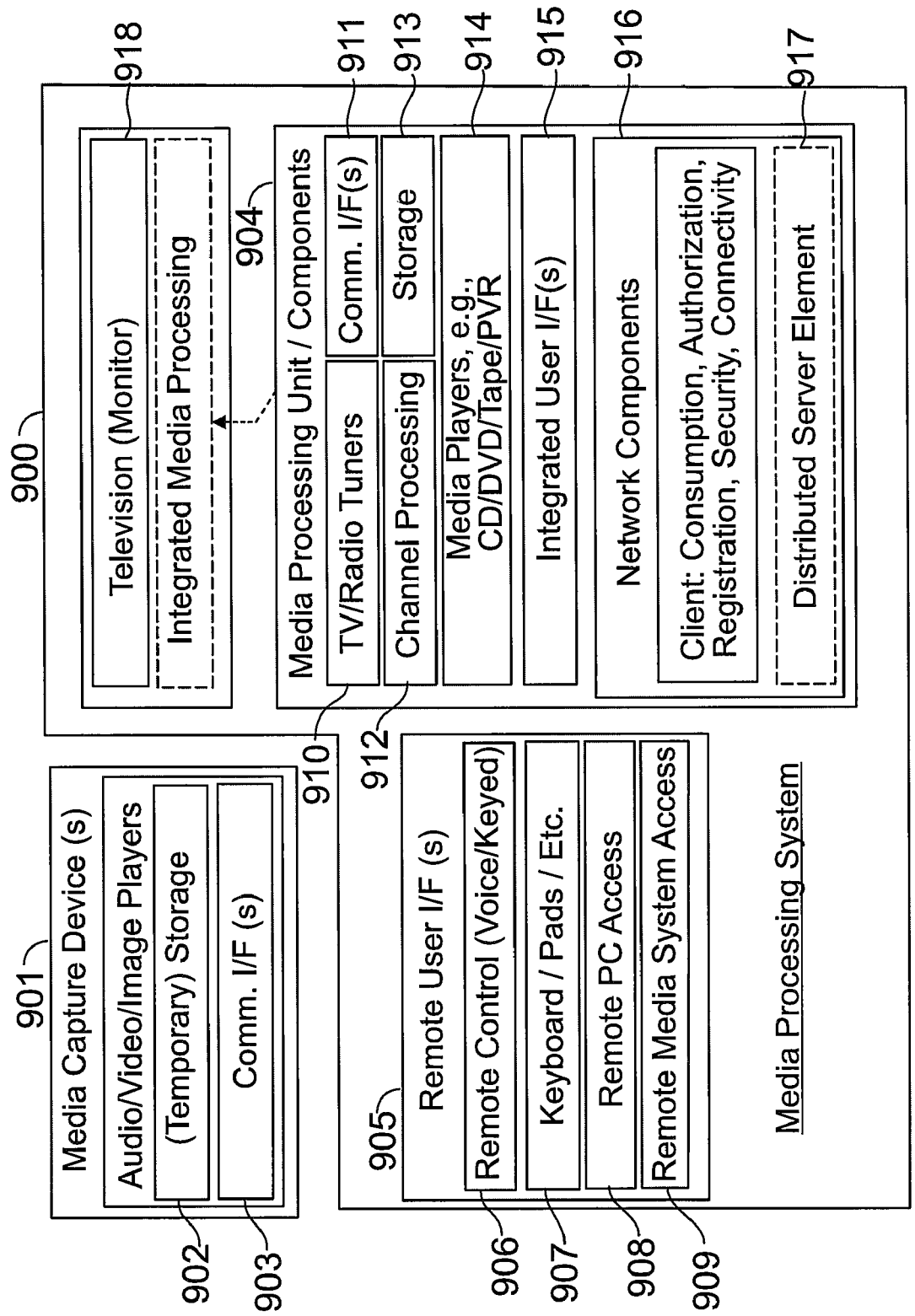
FIG. 9A is a schematic block diagram of a media processing system (MPS) interfacing to media capture peripherals in accordance with an embodiment of the present invention.

FIG. 9A illustrates the detailed elements of a media processing system (MPS) 900 and media capture devices 901 in accordance with an embodiment of the present invention. The media capture devices 901 may comprise audio, video, and image players, such as digital cameras, digital camcorders, and MP3 players, that each include a temporary storage area and a communication interface 903 such as, for example, a USB interface or a wireless interface. The media capture devices 901 have the capability to interface to an MPS and a PC.

The MPS 900 comprises a media processing unit (MPU) 904, remote user interface(s) 905, and a TV screen 918 to provide integrated media processing capability and indirect user interface capability. The remote user interfaces 905 may comprise a voice or keyed remote control 906, keyboards and pads 907, a remote PC access interface 908, and a remote media system access interface 909 (i.e., providing access from another MPS).

The media processing unit (MPU) 904 comprises TV and radio tuners 910 for image and audio consumption, communications interfaces 911, channel processing 912 (creating, storing, indexing, viewing), storage 913, media players 914 (CD, DVD, Tape, PVR, MP3), an integrated user interface 915 (to provide a TV channel guide look-and-feel), networking components 916 to provide client functions such as consumption (billing), authorization (e.g., using digital certificates and digital ID's), registration, security, and connectivity. In an alternative embodiment of the present invention, the networking components 916 may include a distributed server element 917 that is part of a distributed server.

Figure 9B:
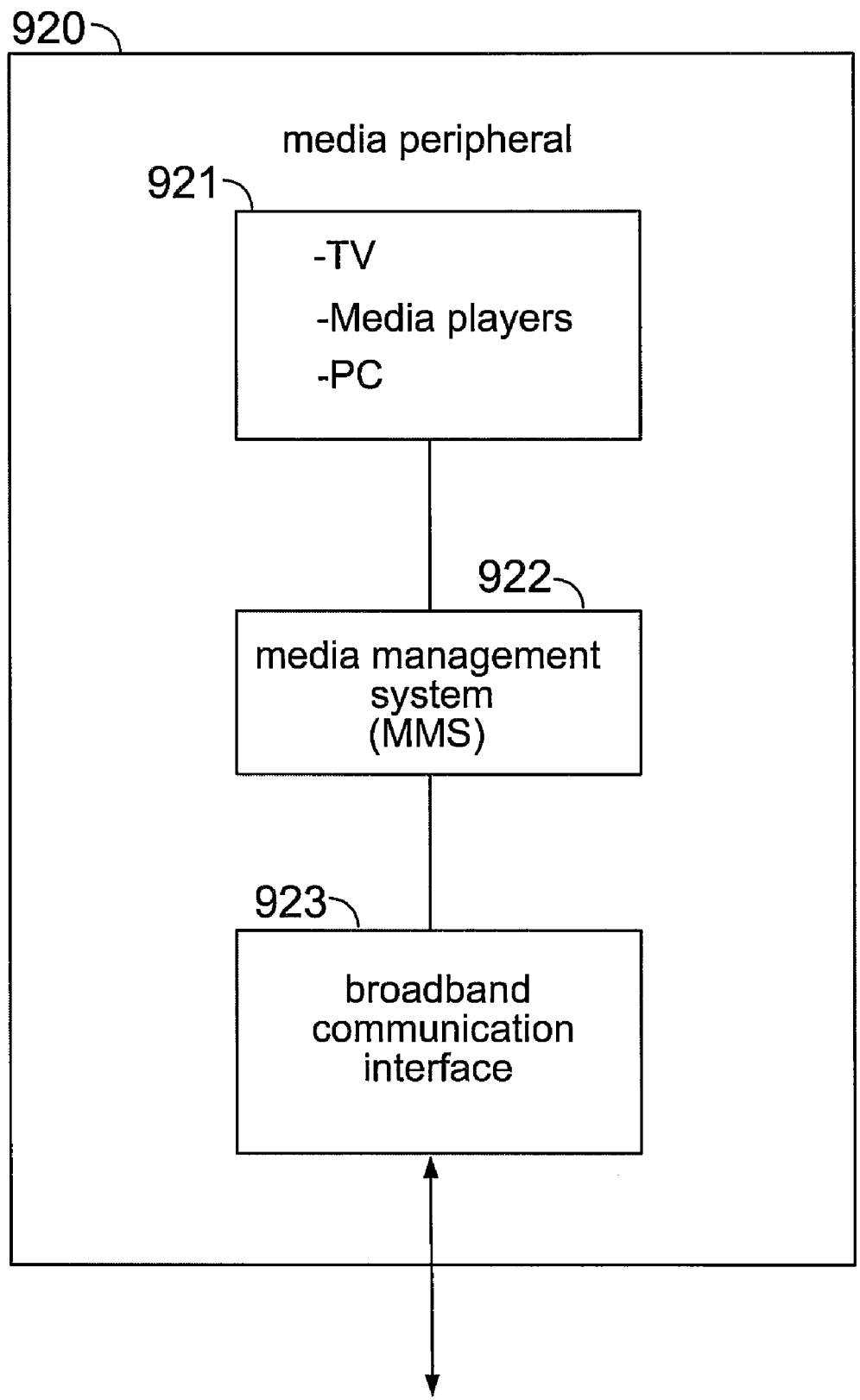
FIG. 9B illustrates an alternative embodiment of a media processing system (MPS) in accordance with various aspects of the present invention.

FIG. 9B illustrates an alternative embodiment of a media processing system (MPS) 920 in accordance with various aspects of the present invention. The MPS 920 is essentially an enhanced set-top-box for viewing and interacting with various user interfaces, media, data, and services that are available on the media exchange network using, for example, a remote control. The MPS 920 comprises a media peripheral 921, a MMS (media management system) 922, and a broadband communication interface 923.

The media peripheral 921 may include a TV (television), a PC (personal computer), and media players (e.g., a CD player, a DVD player, a tape player, and a MP3 player) for video, image, and audio consumption of broadcast and/or personal channels. The broadband communication interface 923 may include internal modems (e.g., a cable modem or DSL modem) or other interface devices in order to communicate with, for example, a cable or satellite head end.

The MMS 922 includes a software platform to provide functionality including media "push" capability, media "access" capability, media channel construction/selection, image sequence selection, text and voice overlay, channel and program naming, inter-home routing selection, authorship and media rights management, shared inter-home media experience, billing service, and a media guide user interface providing an integrated TV channel guide look-and-feel.

Figure 10:
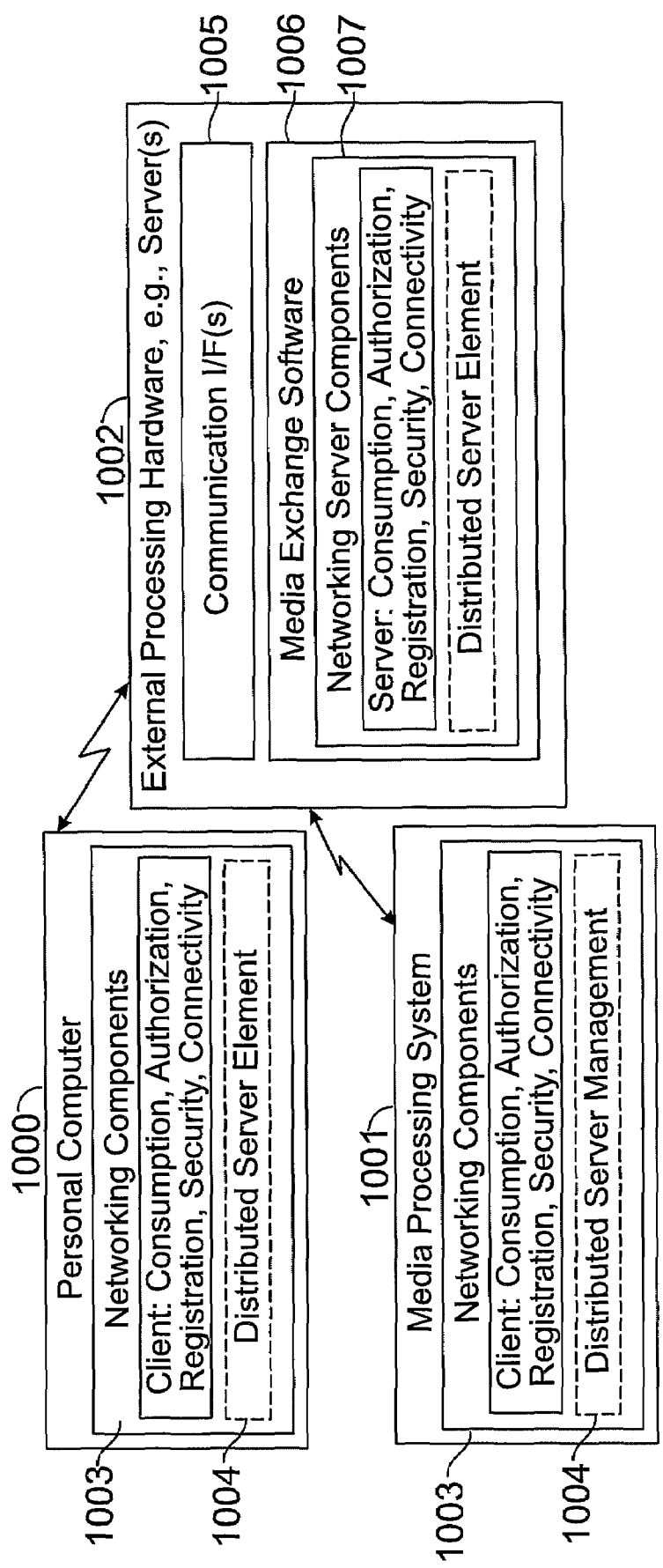
FIG. 10 is a schematic block diagram of a PC and an MPS interfacing to a server on a media exchange network in accordance with an embodiment of the present invention.

FIG. 10 illustrates connectivity between a PC 1000, an MPS 1001, and external processing hardware 1002 (e.g., a server) in accordance with an embodiment of the present invention. The PC 1000 and MPS 1001 include networking components 1003 to provide client functions such as consumption (billing), authorization, registration, security, and connectivity. Alternatively, the PC 1000 and MPS 1001 may include a distributed server element 1004 that is part of a distributed server.

The PC 1000 and MPS 1001 connect to the external processing hardware 1002 via wired or wireless connections. The external processing hardware 1002 comprises a distributed server or peer-to-peer server. The external processing hardware 1002 also comprises communication interfaces 1005 (e.g., cable interfaces, optical interfaces, etc.) and a media exchange software (MES) platform 1006. The MES platform 1006 in the external processing hardware 1002 allows for communication with the PC 1000 and MPS 1001 which may also use the same MES platform 1006. The external processing hardware 1002 also includes networking server components 1007 to provide the similar client functions such as consumption (billing), authorization, registration, security, and connectivity at the server side.

Figure 11:
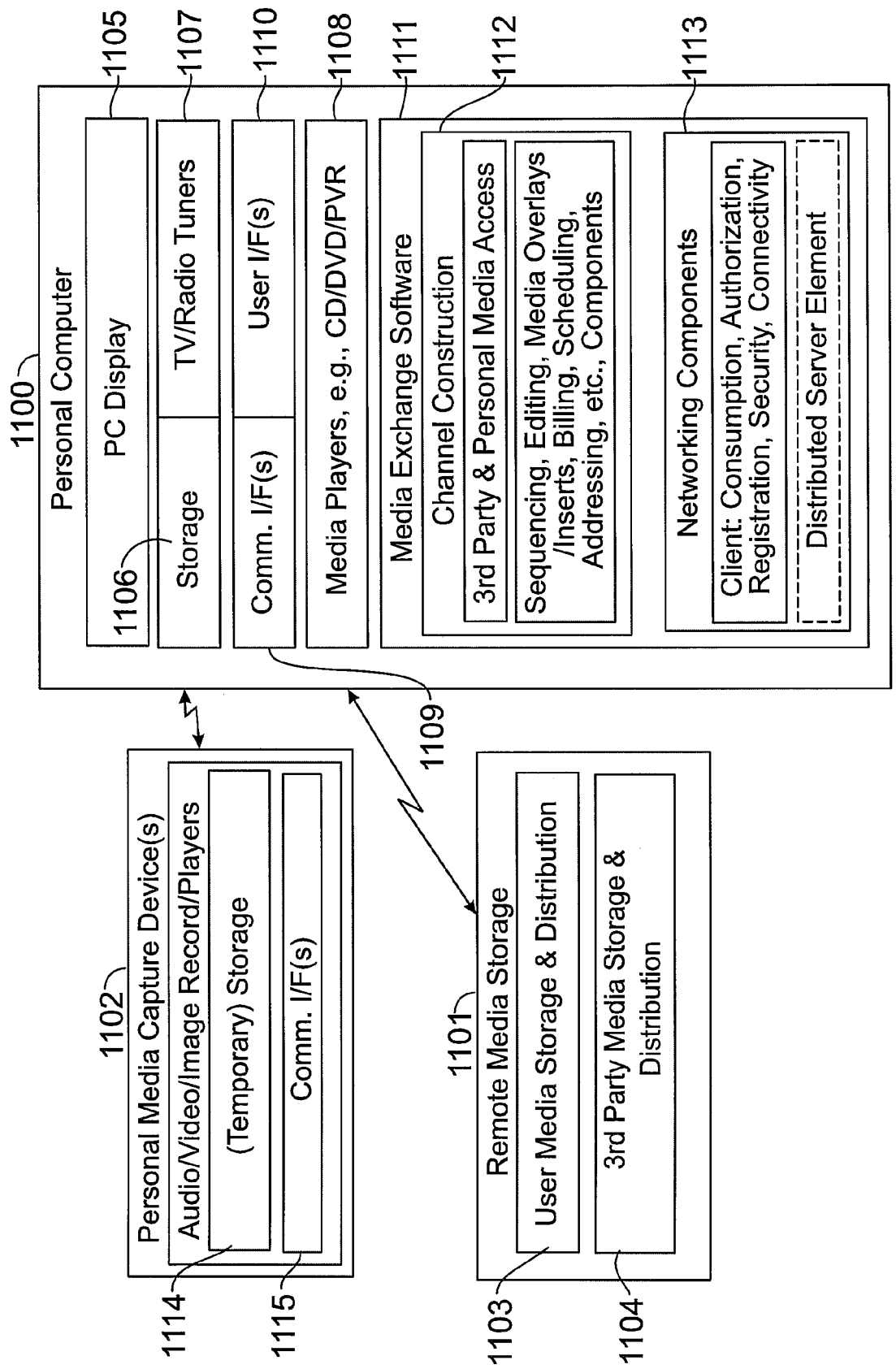
FIG. 11 is a schematic block diagram of a PC interfacing to personal media capture devices and remote media storage on a media exchange network in accordance with an embodiment of the present invention.

FIG. 11 illustrates connectivity between a PC 1100, remote media storage 1101, and personal media capture devices 1102 when the PC 1100 is used as the primary distributor of digital media such as in the case of PC-to-PC operation, in accordance with an embodiment of the present invention. The personal media capture devices 1102 and remote media storage 1101 connect to the PC 1100 via a wireless or wired connection. The remote media storage 1101 provides user media storage and distribution 1103 as well as third party media storage and distribution 1104. The personal media capture devices 1102 provide temporary storage 1114 and communication interfaces 1115.

Viewing is done using a PC monitor 1105 instead of a television screen. The PC 1100 may include storage 1106, TV/radio tuners 1107 for media consumption, media players 1108, and communication interfaces 1109 and user interfaces 1110 similar to those for the MPS of FIG. 9. The PC 1100 includes a media exchange software (MES) platform 1111 that provides channel construction capability 1112 and networking capability 1113. The channel construction capability 1112 allows third party and personal media access, sequencing, editing, media overlays and inserts, billing, scheduling, and addressing.

In summary, a system and method provide common media consumption across multiple media processing systems on a media exchange network via single user control.

Aspects of the present invention may be seen in a system supporting common consumption of media. Such a system may comprise a first television display at a first home, a first storage in the first home, a second television display at a second home, and a second storage in the second home. The first storage may support consumption of the media by the first television display, and may have an associated first network protocol address. Similarly, the second storage may support consumption of the media by the second television display, and may have an associated second network protocol address. The system may also comprise a communication network, and server software that receives a request identifying one of the associated first and second network protocol addresses and responds by identifying the other of the associated first and second network protocol addresses. The system may support delivery via the communication network of the media from the first storage to the second home for simultaneous consumption by the first and second television displays under control of a user at the first home.

The media in an embodiment of the present invention may comprise at least one of audio, still pictures, video, and data, and the media may comprise real-time video. The first and second network protocol addresses may be one of an Internet protocol (IP) address, a media access control (MAC) address, and an electronic serial number (ESN). The communication network may comprise at least one of a cable infrastructure, a satellite network infrastructure, a digital subscriber line (DSL) infrastructure, an Internet infrastructure, an intranet infrastructure, a wired infrastructure, and a wireless infrastructure. The communication network may be the Internet. In an embodiment of the present invention, consumption may comprise at least one of playing audio, displaying a still image, displaying video, and displaying data.

Other aspects of the present invention may be found in a system supporting common consumption of media. A system in accordance with the present invention may comprise a first storage in a first home that stores the media, a second television display at a second home, and a third television display at a third home. The first storage may have an associated first network protocol address, the second television display may have an associated second protocol address, and the third television display may have an associated third protocol address.

An embodiment of the present invention may also comprise set top box circuitry, in the first home, communicatively coupled to deliver the media from the first storage, to the second and third television displays. It may also comprise a communication network. Such an embodiment may further comprise server software that receives a request identifying the associated first network protocol address and responds by identifying the associated second and third network protocol addresses. An embodiment of the present invention may support delivery via the communication network of the media from the first storage to the second and third television displays for concurrent consumption under control of a user at the first home.

The media in an embodiment of the present invention may comprise at least one of audio, still pictures, video, and data, and the media may comprise real-time video. At least one of the first, second, and third protocol addresses may comprise an Internet protocol (IP) address, a media access control (MAC) address, and an electronic serial number (ESN). The communication network may comprise at least one of a cable infrastructure, a satellite network infrastructure, a digital subscriber line (DSL) infrastructure, an Internet infrastructure, an intranet infrastructure, a wired infrastructure, and a wireless infrastructure. In various embodiments of the present invention, the communication network may be the Internet.

In an embodiment of the present invention, the consumption may comprise at least one of playing audio, displaying a still image, displaying video, and displaying data. An embodiment of the present invention may further comprise a first television display at the first home, and the user at the first home may simultaneously consume the media using the first television display.

Additional aspects of the present invention may be observed in a system supporting common consumption of media. Various embodiments in accordance with the present invention may comprise a first television display at a first home, a first storage in a first home that stores the media, a second television display at a second home, set top box circuitry in the first home, and a communication network. The set top box circuitry may be communicatively coupled to deliver the media from the first storage to the second television display. An embodiment may further comprise server software that coordinates delivery via the communication network of the media from the first storage to the second television display for simultaneous consumption of the media at the first and second television displays under control of a user at the first home.

In an embodiment of the present invention, the media may comprise at least one of audio, still pictures, video, real-time video, and data. In addition, the communication network may comprise at least one of a cable infrastructure, a satellite network infrastructure, a digital subscriber line (DSL) infrastructure, an Internet infrastructure, an intranet infrastructure, a wired infrastructure, and a wireless infrastructure. The communication network may be the Internet.

In an embodiment in accordance with the present invention, consumption may comprise at least one of playing audio, displaying a still image, displaying video, and displaying data. In addition, the system may comprise a media peripheral at the second home, and the user at the first home may have control of at least one function of the media peripheral at the second home. A media peripheral in an embodiment of the present invention may comprise at least one of a stereo system, a digital still camera, a digital video camera, a digital camcorder, a digital audio recorder, a personal computer, a PDA, a liquid crystal display (LCD), a plasma display, and a CRT display. In another embodiment of the present invention, the system may comprise a server for storing $3^{rd}$ party media, the server software supporting delivery of the $3^{rd}$ party media to at least one of the first and second television displays.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. One or more circuits for a system supporting common consumption of media, said one or more circuits comprising:
at least one processor operably coupled to a first display device supporting display of television content in a first home and to a first storage in the first home; the first storage supporting consumption of the media by the first display device and having a first network protocol address with respect to a first user in the first home, the at least one processor communicatively coupled to a second home that is separate and distinct from the first home, the second home having a second display device supporting display of television content and a second storage supporting consumption of the media by the second display device in the second home, and having a second network protocol address with respect to a second user in the second home, wherein the second user is known to the first user, the at least one processor operable to, at least:
display a user interface on the first display device in the first home, the user interface having at least one view comprising a representation of media available for consumption, the user interface supporting the selection and scheduling of media for delivery to the second home; and
communicate with server software that maintains a user defined association of the first and second network protocol addresses and that receives a request that identifies one of the associated first and second network addresses and responds by identifying the other of the associated first and second network addresses to support delivery via a communication network of the media from the first storage to the second home for simultaneous consumption by the first and second display devices under control of a user at the first home.

2. The one or more circuits of claim 1 wherein the media comprises one or more of audio, still pictures, video, and/or data.

3. The one or more circuits of claim 1 wherein the media comprises real-time video.

4. The one or more circuits of claim 1 wherein the first and second network protocol addresses are one of an Internet protocol (IP) address, a media access control (MAC) address, or an electronic serial number (ESN).

5. The one or more circuits of claim 1 wherein the communication network comprises one or more of a cable infrastructure, a satellite network infrastructure, a digital subscriber line (DSL) infrastructure, an Internet infrastructure, an intranet infrastructure, a wired infrastructure, and/or a wireless infrastructure.

6. The one or more circuits of claim 1 wherein the communication network is the Internet.

7. The one or more circuits of claim 1 wherein consumption comprises one or more of playing audio, displaying a still image, displaying video, and/or displaying data.

8. One or more circuits for a system supporting common consumption of media, said one or more circuits comprising:
at least one processor operably coupled to a first display device supporting display of television content in a first home and to a first storage in the first home having a first network protocol address with respect to a first user in the first home, the at least one processor communicatively coupled to a second display device supporting display of television content at a second home and a third display device supporting display of television content at a third home, where the second and third homes are separate and distinct from the first home and from each other, where the second home has a second network protocol address with respect to a second user in the second home and the third home has a third network protocol address with respect to a third user in the third home, and wherein the second and third users are known to the first user, the at least one processor operable to, at least:
display a user interface on the first display device in the first home, the user interface having at least one view comprising a representation of media available for consumption, the user interface supporting the selection and scheduling of media for delivery to the second and third homes; and
communicate with server software that maintains a user defined association of the first, second, and third network protocol addresses and that receives a request that identifies the associated first network protocol address and responds by identifying the associated second and third network protocol addresses to support delivery via a communication network of the media from the first storage to the second and third display devices for concurrent consumption under control of a user at the first home.

9. The one or more circuits of claim 8 wherein the media comprises one or more of audio, still pictures, video, and/or data.

10. The one or more circuits of claim 8 wherein the media comprises real-time video.

11. The one or more circuits of claim 8 wherein one or more of the first, second, and/or third network protocol addresses comprise an Internet protocol (IP) address, a media access control (MAC) address, and an electronic serial number (ESN).

12. The one or more circuits of claim 8 wherein the communication network comprises one or more of a cable infrastructure, a satellite network infrastructure, a digital subscriber line (DSL) infrastructure, an Internet infrastructure, an intranet infrastructure, a wired infrastructure, and/or a wireless infrastructure.

13. The one or more circuits of claim 8 wherein the communication network is the Internet.

14. The one or more circuits of claim 8 wherein consumption comprises one or more of playing audio, displaying a still image, displaying video, and/or displaying data.

15. The one or more circuits of claim 8 wherein the user at the first home simultaneously consumes the media using the first display device.

16. One or more circuits for a system supporting common consumption of media, said one or more circuits comprising:
at least one processor operably coupled to a first display device supporting display of television content in a first home and to a first storage in the first home that stores the media, the at least one processor communicatively coupled to the first storage and to a second display device supporting display of television content at a second home that is separate and distinct from the first home, the at least one processor operable to, at least:
display a user interface on the first display device in the first home, the user interface having at least one view comprising a representation of media available for consumption, the user interface supporting the selection and scheduling of media for delivery to the second home; and
communicate with server software that coordinates delivery via the communication network of the media from the first storage to the second display device for simultaneous consumption of the media at the first and second display devices under control of a user at the first home.

17. The one or more circuits of claim 16 wherein the media comprises one or more of audio, still pictures, video, real-time video, and/or data.

18. The one or more circuits of claim 16 wherein the communication network comprises one or more of a cable infrastructure, a satellite network infrastructure, a digital subscriber line (DSL) infrastructure, an Internet infrastructure, an intranet infrastructure, a wired infrastructure, and/or a wireless infrastructure.

19. The one or more circuits of claim 16 wherein the communication network is the Internet.

20. The one or more circuits of claim 16 wherein consumption comprises one or more of playing audio, displaying a still image, displaying video, and/or displaying data.

21. The one or more circuits of claim 16 further comprising: a media peripheral at the second home; and the user at the first home having control of at least one function of the media peripheral at the second home.

22. The one or more circuits of claim 21 wherein the media peripheral comprises one or more of a stereo system, a digital still camera, a digital video camera, a digital camcorder, a digital audio recorder, a personal computer, a PDA, a liquid crystal display (LCD), a plasma display, and/or a CRT display.

23. The one or more circuits of claim 16 further comprising: a server for storing $3^{rd}$ party media; and the server software supporting delivery of the $3^{rd}$ party media to at least one of the first and second display devices.

24. A system supporting common consumption of media, the system comprising:
at least one processor communicatively coupled to deliver the media from a first storage at a first home to a second display device supporting display of television content at a second home that is separate and distinct from the first home, the at least one processor operable to, at least:
cause display of a user interface on a first display device supporting display of television content at the first home, the user interface having at least one view comprising a representation of media available for consumption, the user interface supporting the selection and scheduling of media for deliver to the second display device at the second home; and
communicate with software that coordinates delivery via a communication network of the media from the first storage to the second display device for concurrent consumption of the media at the first display device at the first home and the second display device at the second home, under control of a user at the first home.

25. The system of claim 24 wherein the media comprises one or more of audio, still pictures, video, real-time video, and/or data.

26. The system of claim 24 wherein the communication network comprises one or more of a cable infrastructure, a satellite network infrastructure, a digital subscriber line (DSL) infrastructure, an Internet infrastructure, an intranet infrastructure, a wired infrastructure, and/or a wireless infrastructure.

27. The system of claim 24 wherein the communication network is the Internet.

28. The system of claim 24 wherein consumption comprises one or more of playing audio, displaying a still image, displaying video, and/or displaying data.

29. The system of claim 24 wherein a media peripheral is located at the second home; and the user at the first home having control of at least one function of the media peripheral at the second home.

30. The system of claim 29 wherein the media peripheral comprises one or more of a stereo system, a digital still camera, a digital video camera, a digital camcorder, a digital audio recorder, a personal computer, a personal digital assistant (PDA), a liquid crystal display (LCD), a plasma display, and/or a cathode ray tube (CRT) display.

31. The system of claim 24 wherein the software supports delivery of third party media to one or both of the first and second display devices.

* * * * *